Feb. 24, 1959     I. T. QUARNSTROM     2,874,409

PLASTIC MOLD BASE

Filed June 21, 1954     2 Sheets-Sheet 1

INVENTOR.
IVAR T. QUARNSTROM
BY
Robert A. Sloman
ATTORNEY.

Feb. 24, 1959     I. T. QUARNSTROM     2,874,409
PLASTIC MOLD BASE
Filed June 21, 1954     2 Sheets-Sheet 2
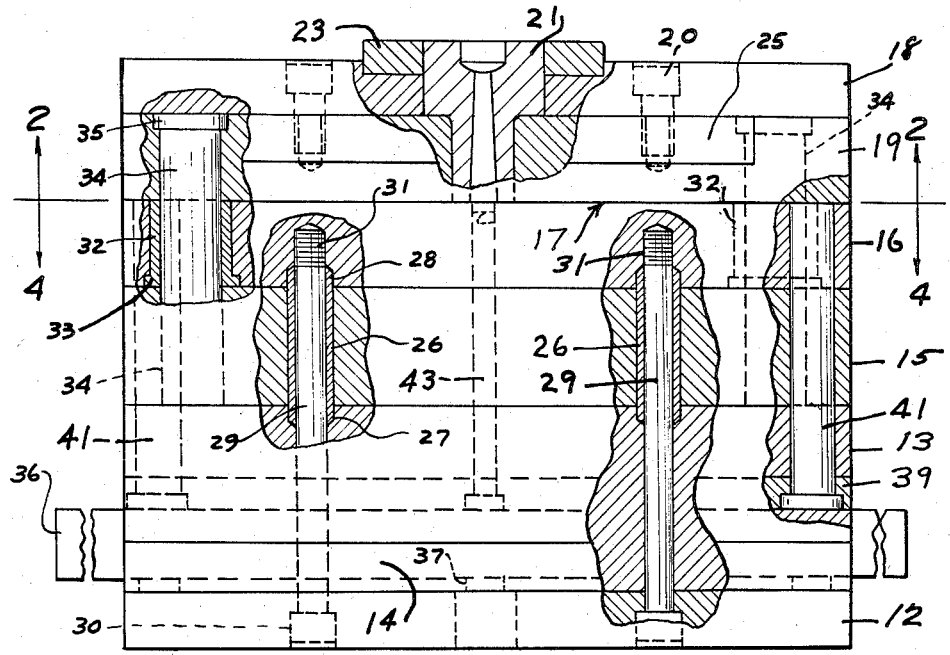
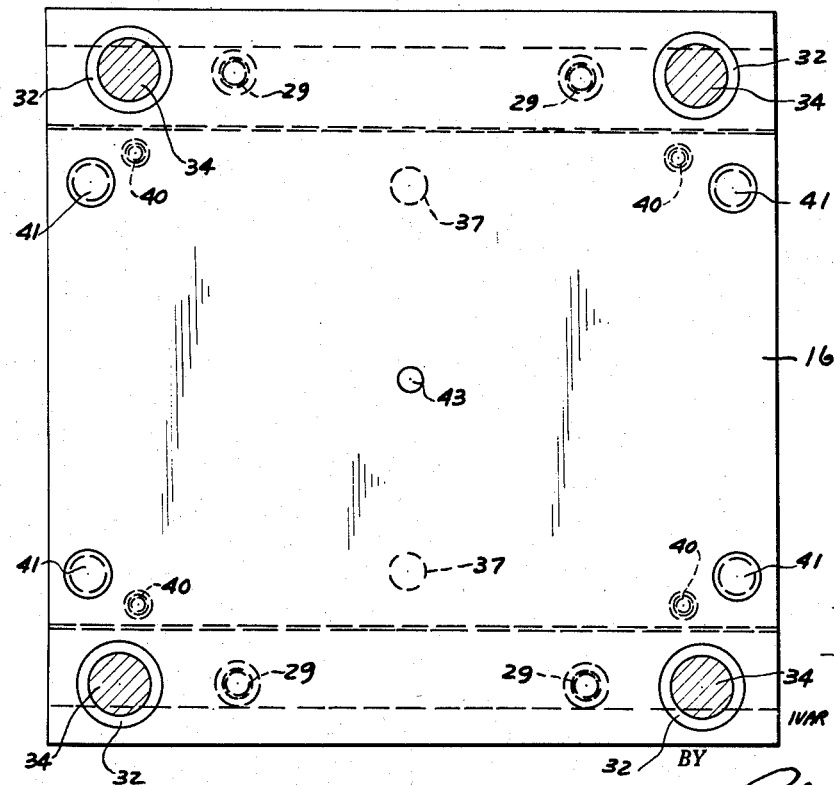
INVENTOR.
IVAR T. QUARNSTROM
BY
Robert A. Sloman
ATTORNEY.

United States Patent Office 2,874,409
Patented Feb. 24, 1959

2,874,409

PLASTIC MOLD BASE

Ivar T. Quarnstrom, New Haven, Mich., assignor to Detroit Mold Engineering Co., Detroit, Mich., a corporation of Michigan Application June 21, 1954, Serial No. 437,907

1 Claim. (Cl. 18—42)

This invention relates to ejection plastic molding, and more particularly to an improved mold base construction.

It is the object of the present invention to provide an improved ejector box construction for the mold base.

It is the further object of the present invention to provide an improved ejector box construction which eliminates certain heretofore conventional ledges to thereby produce a greater molding area for a given size of machine.

It is the further object of the present invention to provide a novel rest button construction for the ejector plate.

It is the still further object of the present invention to employ a novel dowel pin structure for increased strength and so arranged as to cut down the number of dowel pins heretofore employed thereby providing more space for the selective positioning of water lines.

These and other objects will be seen from the following specification and claims in conjunction with the appended drawings, in which:

Fig. 3 is a side elevational view of the mold base partially broken away and sectioned for illustration; and Fig. 4 is a section taken on line 4—4 of Fig. 3.

Figure 1:
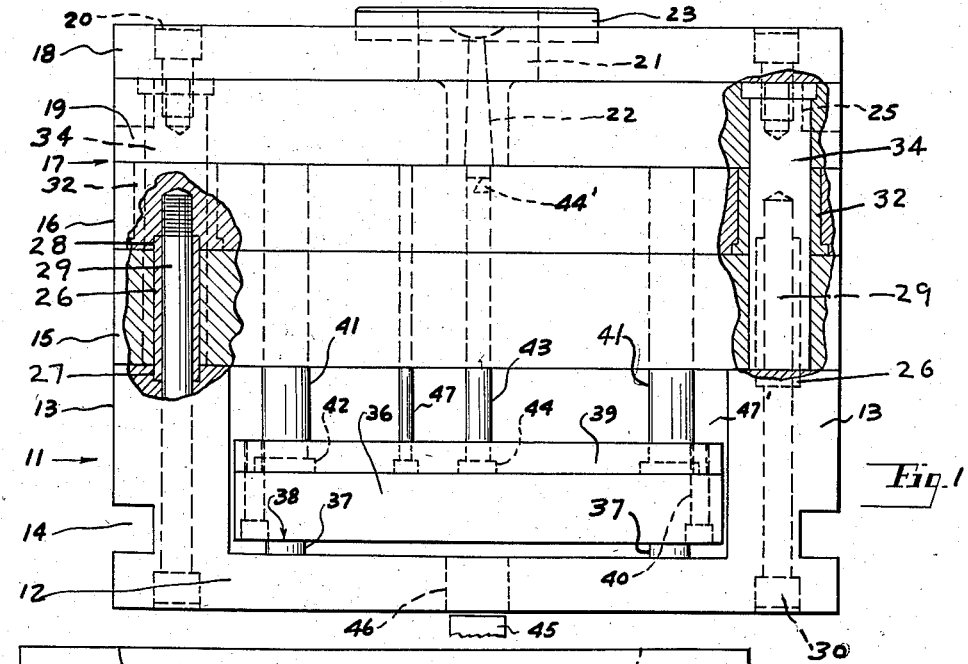
Fig. 1 is a front elevational view of the present mold base.

It will be understood that the above drawings illustrate merely a preferred embodiment of the invention, and that other embodiments are contemplated within the scope of the claim hereafter set forth.

Referring to the drawings, the mold base in many respects is in accordance with my prior Patent Number 2,398,893, entitled, "Standard Molding Base."

The present mold base includes an ejector box generally indicated at 11, which includes bottom clamping plate 12 of substantially rectangular shape upon the opposite sides of which are mounted the upright parallels 13 and which in the preferred embodiment are formed as an integral part of plate 12 or suitably welded thereto to provide a rigid unit. Upon the exterior surfaces of supports 13 and extending throughout their length are the elongated undercut slots 14 which provide an effective means for securing clamping plate 12 to the movable portion of a molding machine upon which the present mold base is used.

Rectangular back-up plate 15 is juxtaposed upon supports 13, and juxtaposed upon plate 15 is cavity retainer plate 16. Cavity retainer plate 16, which is adapted to have inserted therein a preformed core element for an article to be molded, is secured upon plate 15 and plate 15 is secured upon supports 13 by the four elongated assembly bolts 29 whose enlarged heads 30 are retained within corresponding recesses in plate 12, and which bolts extend through registering openings in supports 13, plate 15 and whose ends are tightly threaded as at 31, Fig. 3, into movable cavity retainer plate 16 to thereby define a complete assembly extending to the parting line indicated at 17 in Fig. 1.

There is also provided as a part of the present mold base a top clamping plate 18 and secured to one side thereof is the stationary cavity retainer plate 19, by means of the fastening screws or bolts 20. Plate 19 is adapted to have selectively positioned therein the complemental core or cavity which cooperatively registers with an opposing core or cavity secured within cavity plate 16 for defining between said cores and cavities the molded article. For this purpose there is provided a sprue bushing 21, Fig. 1, which is centrally projected down through plates 18 and 19 and has mounted upon its outer end projecting above plate 18 the locating ring 23 which is adapted to extend within that portion of the molding machine from which is delivered the plastic molding material to be molded in the present molding device.

Figure 2:
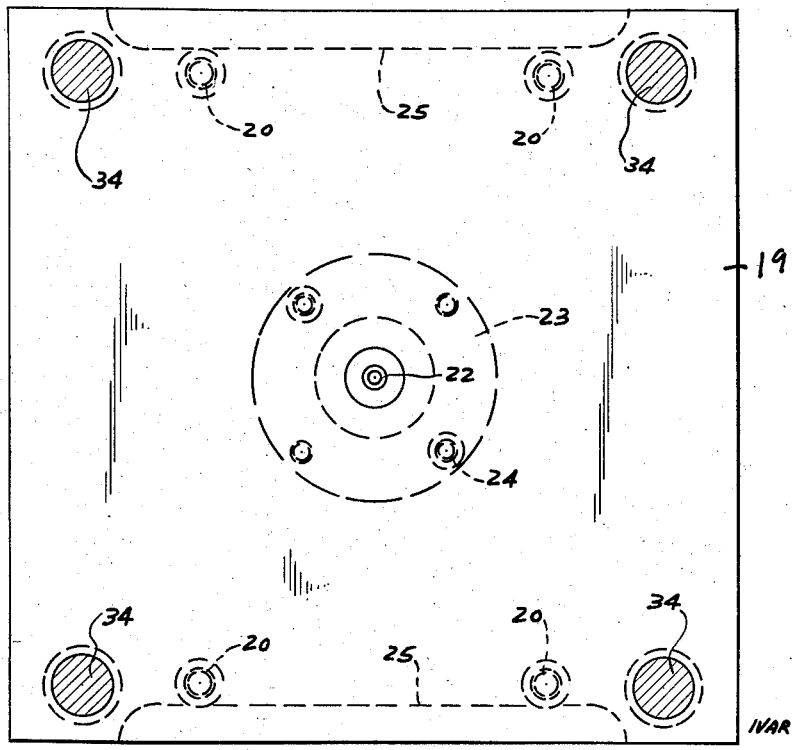
Fig. 2 is a section taken on line 2—2 of Fig. 3.

As shown in Fig. 2, the locating ring 23 is secured within a central recess in the top surface of plate 18 by a series of screws 24.

Upon opposite sides of the mold base, and formed in the exterior side walls of plate 19 there are the undercut slots 25 corresponding to slots 14, which provide clamping means whereby the stationary portion of the mold base is secured within the molding machine.

Plates 18 and 19 therefore form the second unit of the mold base which is separated from the first unit at parting line 17 of Fig. 1. The sprue bushing has a central passage 22 which delivers the plastic material to be molded to the parting line 17 between the opposed cavity retainer plates 16 and 19, which are so cut as to permit the flow of plastic material in order to completely fill the respective cores and cavities.

As shown in Figs. 1 and 3, there are provided a pair of tubular dowel pins 26, which as shown in Fig. 3, cooperatively extend through corresponding aligned openings in supports 13 as shown at 27, back-up plate 15 and into cavity retainer plate 16 as at 28, to thereby assure a fixed relationship between said plates against lateral displacement.

In the present construction the tubular dowel pins are so arranged that two of the assembly bolts extend up through tubular bushings 26 to thereby economize in the space used. Such economy provides for additional area through which water pipes may extend for cooling the mold base after the molding operation to facilitate and speed solidification of the plastic material.

Bushings 32 with enlarged annular shoulders 33 are nested and retained within movable cavity plate 16 adjacent the four corners thereof as shown in Fig. 4, and are adapted to slidably and cooperatively receive the corresponding leader pins 34 with enlarged heads 35, which are secured within plate 19 and which depend therefrom through bushings 32 and into corresponding aligned apertures formed in back-up plate 15. Said leader pins thereby assure the correct registry of the respective cores and cavities as cavity retainer plate 16 is brought into contact with cavity retainer plate 19 at parting line 17.

Positioned within the interior of ejector box 11 and extending outwardly therefrom as shown in Fig. 3, there is provided a rectangularly shaped reciprocal ejector plate 36. Adjacent the four corners thereof and secured to the undersurface of ejector plate 36 are a set of rest pads or stop buttons 37, being secured to plate 36 as by welding as at 38, Fig. 1. These pads space said ejector plate above the bottom wall of the ejector box. Retainer plate 39 is juxtaposed over plate 36 and secured by the headed bolts 40 thereto.

Ejector plate return pins 41 extend upwardly from the corners of retainer plate 39 with their heads 42 secured in undercut notches therein. Return pins 41 loosely extend through aligned apertures in plates 15 and 16, and after the performance of the ejecting operation extend above plate 16. When plates 16 and 19 are brought together, plate 19 operatively projects the pins 41 and the ejector plate 36 attached thereto back to the position shown in Fig. 1.

The ejector plate has secured thereto normally in axial alignment with a set of cores and cavities, a series of ejector pins 47 which are of the same construction substantially as sprue puller pin 43 of Fig. 1, which has an enlarged head 44 secured within an undercut notch in plate 39.

After the introduction of the plastic material through the sprue bushing, and after sufficient cooling interval, the plates 12, 13, 15 and 16 are withdrawn from plate 19 at parting line 17 under the action of the molding machine. There is shown in Fig. 1, fragmentarily, a stationary shaft 45, which upon rearward movement of plate 12 loosely projects through a corresponding opening 46 in said plate, and operatively engages the undersurface of ejector plate 36, to thereby effect a relative upward movement of said plate within chamber 47' of said ejector box. The ejector pins correspondingly move upwardly engaging the respective molded articles for ejecting them from the core portions of one of the cavity retainer plates 16.

Sprue puller pin 43 has an undercut slot 44' in its upper end adjacent parting line 17 within which a portion of the mold sprue enters and solidifies. This structure provides a convenient method of pulling the sprue from the passage 22 of the sprue bushing as plate 16 is withdrawn. One such ejector pin is shown at 47, for illustration.

The presently improved mold base provides a unitary ejector box 11 to thus produce a more rigid structure. The lateral extension heretofore employed in the bottom clamping plate 12 is eliminated by the use of the undercut slots 14 of Fig. 1. This provides for increased safety and eliminates the later extension heretofore required as a clamp. Thus there is provided a greater molding area for a given size of machine.

Heretofore, the old type of rest button had a depending shank which extended down into drilled openings in bottom plate 12. Often these buttons would become accidentally disengaged from their supports and produce damage to the molding machine. By directly welding the buttons to the undersurface of the ejector plate, this danger is eliminated.

Furthermore the drilling of the openings in the bottom plate 12 is eliminated. An additional advantage in the present construction of rest pad or button 37 resides in the fact that by eliminating the shanks heretofore employed, an opening may be drilled down through the button to permit the location of cores to be secured to the bottom plate 12, for certain types of molding, which cores extend up through back-up plate 15 and into plate 16 and cooperate with the mold cavity during certain molding operations. Heretofore, it was impossible to position such cores at the location of the stop buttons.

The presently improved tubular dowel pins, of which there are only two, not only provide for a more rigid structure but save space inasmuch as the assembly bolts may be positioned so as to extend upwardly therethrough, as shown in Fig. 3. In view of the unitary structure of the ejector box only two of such dowel pins are needed, whereas heretofore at least double the number were required.

This means further that there is more space available for the positioning of water pipes through the mold base. Additionally, the long anchoring of the dowel pins within the back-up plate assures that the dowel pins will stay in their original position and thus provides a greater guarantee against relative longitudinal movement of such dowel pins and back-up plate 15.

By removal of the lateral extensions from plate 12, the finished mold base occupies less space and is, therefore, easier to store and to ship.

The present one piece ejector box provides a more rigid mold construction, and the elongated clamping slots 14 in parallels 13 greatly improves the clamping strength of the mold base. By eliminating the conventional dowel pins in cavity retainer plate 16, more room is provided therein for the introduction of water lines.

By eliminating the heretofore conventional clamping flanges formed upon clamping plate 12, there is provided an increase in the molding area for a maximum size mold in the press.

It is contemplated that the parallel supports 13 forming a part of the ejector box 11 can be slotted as and where desired to allow clearance for outrigger ejector pins without in any way impairing the assembly of the ejector box.

The present construction employing the undercut clamping slots 14 and 25 thereby provides for easier and safer handling, as well as storing and mounting in the press with which the molding base is employed.

By employing only the two dowel pins 26 of tubular construction arranged as shown in Fig. 3, six dowel pins heretofore additionally employed are eliminated.

The dowel tube 26 by virtue of its long bearing in back-up plate 15, will remain in this plate when disassemblying the mold base. It has been found from experience that the preferred ¾ inch dowel tube presently employed is approximately twenty-five percent (25%) stronger than the heretofore conventional ½ inch diameter dowel pin, and is equal in strength to a ⅝ inch diameter dowel pin.

A further advantage of the present tubular dowel pin is that it does not occupy any usable space.

The stop mountings 37 being welded securely to ejector plate 36 will not come loose to cause damage in operation. However, the weld is soft and can be drilled through, is desired.

Having described my invention, reference should now be had to the claim which follows for determining the scope thereof.

I claim:

In a mold base for plastic injection molding having a hollow ejector member of U-shape in cross-section, a backup plate positioned over said member providing a cover therefor, a cavity retainer plate superposed upon said backup plate, a plurality of laterally spaced dowels extending through accurately aligned bores in said ejector member and plates, and fasteners securing said plates and ejector member together; the improvement wherein said dowels are formed in tubular shape and of uniform diameter throughout their length and extend snugly and tightly through accurately aligned apertures formed in said ejector member, backup plate and cavity retainer plate, said fasteners consisting of bolts projecting through each of said dowels respectively, sized to move freely through said dowels whereby when said bolts are tightened the forces caused thereby are applied coaxially with the longitudinal axis of the dowels, said bolts extending from said ejector member into spaced threaded apertures in said cavity retainer plate whereby said member and plates will be formed into a unitary, accurately aligned assembly adapted for mounting upon the reciprocal part of a molding machine.

References Cited in the file of this patent

UNITED STATES PATENTS

| | | |
|---|---|---|
| 2,419,089 | Quarnstrom | Apr. 15, 1947 |
| 2,456,423 | Jobst | Dec. 14, 1948 |
| 2,479,350 | Haggart, Jr. | Aug. 16, 1949 |
| 2,480,605 | Quarnstrom | Aug. 30, 1949 |
| 2,483,094 | Harvey | Sept. 27, 1949 |
| 2,492,483 | Keene | Dec. 27, 1949 |
| 2,494,777 | Patterson et al. | Jan. 17, 1950 |
| 2,511,350 | Kosobud | June 31, 1950 |
| 2,560,291 | Howie | July 10, 1951 |
| 2,560,413 | Carlson | July 10, 1951 |
| 2,592,296 | Kutik | Apr. 8, 1952 |
| 2,596,993 | Gookin | May 20, 1952 |
| 2,645,815 | Quarnstrom | July 21, 1953 |
| 2,652,297 | Stearns et al. | Sept. 15, 1953 |